United States Patent [19]

Bell

[11] Patent Number: 4,519,070
[45] Date of Patent: May 21, 1985

[54] METHOD OF INITIALIZING AND RECOVERING FROM FAILURES IN A LOCAL AREA NETWORK

[75] Inventor: John L. Bell, Escondido, Calif.

[73] Assignee: Burroughs Corporation, Detroit, Mich.

[21] Appl. No.: 571,928

[22] Filed: Jan. 19, 1984

[51] Int. Cl.³ .............................................. H04J 3/14
[52] U.S. Cl. ........................................ 370/88; 370/16
[58] Field of Search ................. 370/88, 86, 85, 13, 370/16, 14, 15; 179/175, 38

[56] References Cited

U.S. PATENT DOCUMENTS

| | | | |
|---|---|---|---|
| 3,652,798 | 3/1972 | McNeilly et al. | 370/88 |
| 3,859,468 | 1/1975 | Smith et al. | 370/88 |
| 3,876,983 | 4/1975 | Zafiropulo et al. | 179/175.3 S |
| 4,190,821 | 2/1980 | Woodward | 370/16 |
| 4,254,496 | 3/1981 | Munter | 370/85 |
| 4,334,303 | 6/1982 | Bertin et al. | 370/13 |
| 4,347,605 | 8/1982 | Hashizume et al. | 370/88 |

FOREIGN PATENT DOCUMENTS

| | | | |
|---|---|---|---|
| 56-75747 | 6/1981 | Japan | 370/88 |
| 56-158551 | 12/1981 | Japan | 370/88 |

Primary Examiner—Douglas W. Olms
Assistant Examiner—Wellington Chin
Attorney, Agent, or Firm—Charles J. Fassbender; Kevin R. Peterson

[57] ABSTRACT

A method of operating a communication station having two sets of paired input and output terminals which are normally coupled to respective paired sets of terminals in two other stations to form a network includes the steps of: monitoring the input terminal of one set of terminals in the station to detect an idle signal, a delimiter signal, or silence thereon; transmitting the idle signal on the output terminal of the one set if silence is detected by the monitoring step; sending the delimiter signal on the output terminal of the one set if the idle signal is detected by the monitoring step; and coupling internally in the station the input terminal of the one set to an output terminal of the station in a predetermined fashion to permit signals on the input terminal of the one set to pass through the station if the delimiter signal is detected on the input terminal by the monitoring step.

11 Claims, 5 Drawing Figures

(SEE FIG. 4B.)

METHOD OF INITIALIZING AND RECOVERING FROM FAILURES IN A LOCAL AREA NETWORK

BACKGROUND OF THE INVENTION

This invention relates to methods of operating a station in a computer network; and more particularly it relates to methods of initializing a station and enabling a station to recover from hardware failures in such network.

Each station in a computer network typically has two sets of paired input and output terminals. These are normally coupled to respective paired sets of terminals of other stations on the network. Thus, if the coupling between stations is not broken and all the stations are operable, messages can be sent from any first station to any second station in the network by serially passing the message over the interstation coupling and through all of the stations which lie between the first and second stations.

A tutorial explanation of the many different aspects of computer networks is provided in the text *Computer Networks and Their Protocols* by D. W. Davies et al, published 1979 by John Wiley & Sons. Additional information is provided in the text entitled *Computer Networks* by Andrew S. Tanenbaum, published 1981 by Prentice-Hall, Inc. These texts describe, for example, various computer network topologies and protocols for routing messages from one station on the network to another. All of their teachings are herein incorporated by reference.

One problem, however, which exists in computer networks of the prior art occurs when a station or the coupling between stations becomes broken. When that occurs, messages cannot be passed from one station to another through the broken station or coupling. Thus a method is needed for rerouting messages through only those stations and interstation couplings which are operable. Otherwise, a single broken station or broken coupling in a network of many stations would render the entire network inoperable.

Also, when a broken station or broken coupling between stations is repaired, a method is needed for sensing such occurrence and for again rerouting the flow of the messages through the network such that the repaired stations and couplings are included in the message flow.

A similar problem occurs when all the stations of a network are initially powered down; and subsequently the stations are powered on one at a time in a random sequence. Here a method is needed for continuously sensing which stations and interstation couplings are operable, and for continuously rerouting the flow of messages through the operable ones as they increase in number.

Accordingly, a primary object of the invention is to provide a method of operating a station in a communication network such that it determines whether or not another station to which it is coupled plus the coupling itself is operable, and in response thereto causes internal message rerouting actions to occur such that messages can be sent through itself to the other station.

BRIEF SUMMARY OF THE INVENTION

In accordance with the present invention, a station is operated in a communication network that is comprised of a plurality of similar stations. Each station has two sets of paired input and output terminals which are normally coupled to respective paired sets of terminals in two other stations. Operating one station according to the invention establishes that the coupling to and from another station as well as the other station itself is not broken and causes message-rerouting actions to occur internally within the one station in response thereto. More specifically, the one station performs the steps of:

monitoring the input terminal of one set of its terminals to detect an idle signal, a delimiter signal, or silence thereon;

transmitting the idle signal on the output terminal of the one set if silence is detected by the monitoring step;

sending the delimiter signal on the output terminal of the one set if the idle signal is detected by the monitoring step; and coupling internally in the one station, if the delimiter signal is detected on the input terminal by the monitoring step, the input terminal of the one set to an output terminal in a predetermined fashion to permit signals on the input terminal of the one set to pass through the station.

Additional steps performed by the one station may include:

(a) breaking any internal coupling between the input and output terminals of its other set if such coupling exists when the delimiter signal is detected by the monitoring step; and
   coupling internally in the one station the input and output terminals of its opposite sets if the breaking step is performed;

(b) coupling the input terminal of its one set to the output terminal of its one set if the input and output terminals of its other set are not coupled together when the delimiter signal is detected by the monitoring step;

(c) detecting the idle signal on its input terminal by sending a signal waveform of any predetermined shape, detecting the delimiter signal by sensing a signal waveform of any other shape, and detecting silence by sending the absence of any signal.

BRIEF DESCRIPTION OF THE DRAWINGS

Various features of the invention are described in the Detailed Description in conjunction with the accompanying drawings wherein.

DETAILED DESCRIPTION OF THE INVENTION

Figure 1:
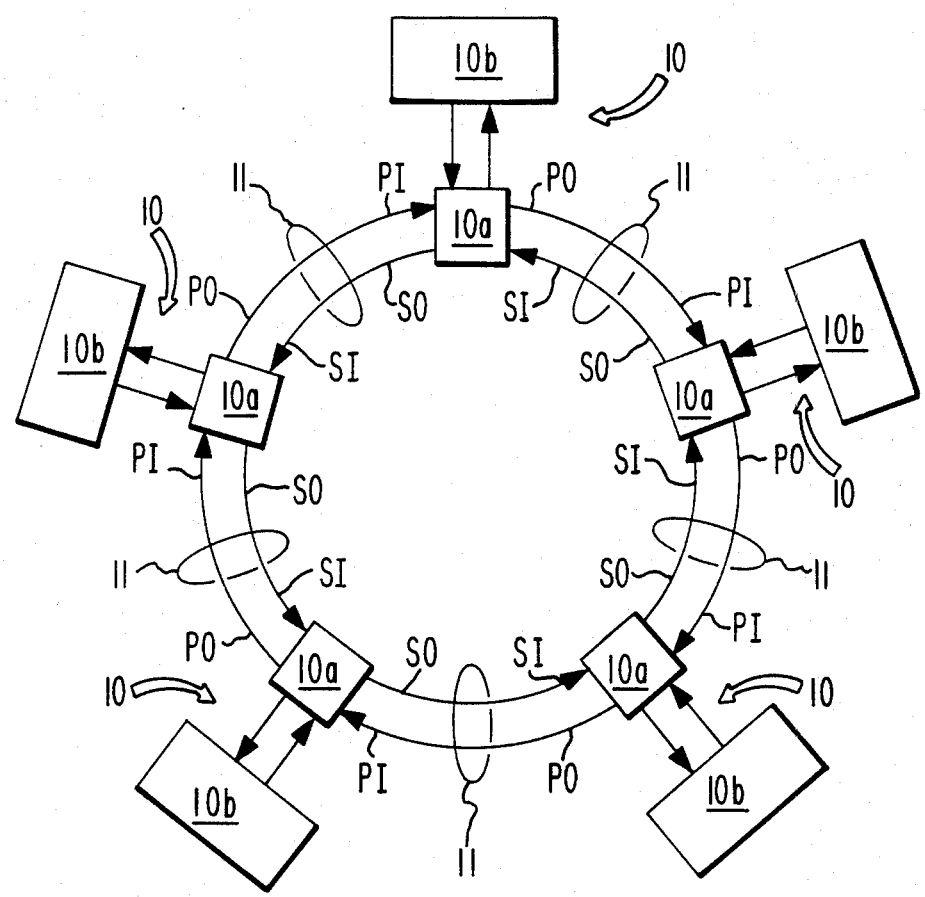
FIG. 1 shows a network of stations, each of which operates in accordance with the invention.

Referring now to FIG. 1, there is illustrated a communication network which includes a plurality of stations 10 each of which is constructed according to the invention. Each station 10 has two sets of paired input and output termnals. One of those sets consists of a primary input terminal (PI) and a secondary output terminal (SO), and the other set consists of a primary output terminal (PO) and a secondary input termnal (SI).

Under normal operation conditions, each station 10 in the network has its primary input terminal and secondary output terminal respectively coupled via a coupling 11 to the primary output terminal and secondary input terminal of an adjacent station. This coupling 11, however, may become temporarily broken from time to time. Suitably, the coupling 11 consists of a pair of optical fibers or a pair of electrical conductors.

As shown in FIG. 1, each of the stations 10 is comprised of a portion 10a and a portion 10b. Portion 10a includes the two sets of paired input and output terminals, and it operates to internally couple those terminals together within the station in a predetermined fashion in a response to the signal state of the input terminals. All of the details of this operation are described herein in conjunction with the remaining figures.

Portion 10b, by comparison, operates at a higher level of intelligence. Specifically, portion 10b sends messages to another station over the coupling 11 after portion 10a has established an appropriate internal coupling between its input and output terminals. Likewise, portion 10b receives messages from other stations over the coupling 11 after portion 10a has established an appropriate internal coupling between its input and output terminals. Details of the message format and the manner in which the stations time-share the network are irrelevant to the scope of this invention and thus are not considered here.

Figure 2:
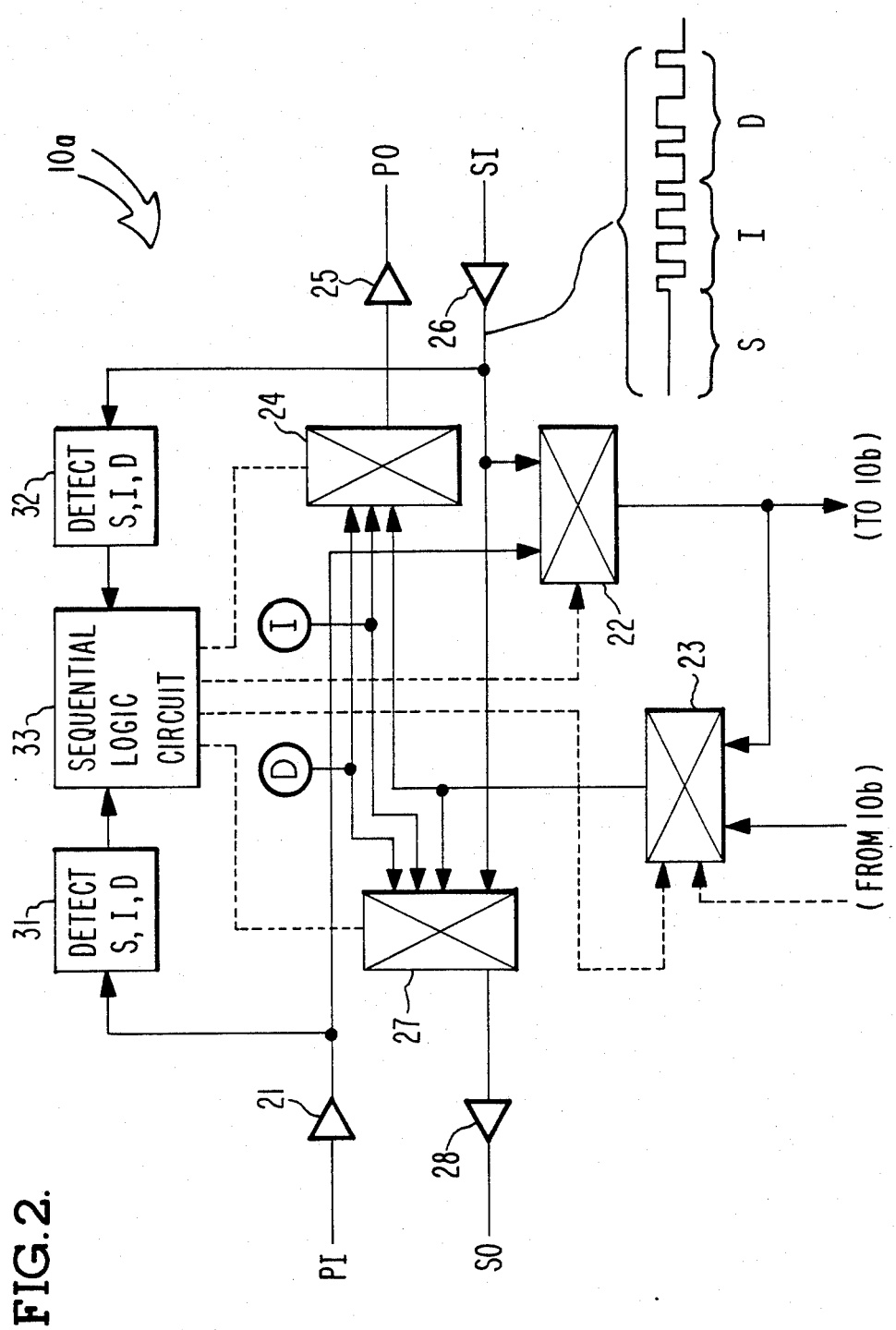
FIG. 2 shows a detailed circuit diagram of portion 10a of the stations of FIG. 1.

Turning now to FIG. 2, a schematic diagram illustrates portion 10a of station 10 in greater detail. Here again, the symbols PI, SO, PO, and SI indicate the various input and output terminals that were described above.

Terminal PI is connected to the input of a receiver 21 which in turn has its output connected to an input of a multiplexer 22. Output signals from multiplexer 22 are sent to portion 10b of station 10, and those same signals are also sent to an input of another multiplexer 23. Signals from portion 10b of station 10 are sent to a second input of multiplexer 23. Output signals from multiplexer 23 are sent to an input of another multiplexer 24; and output signals from multiplexer 24 are sent to the input of a receiver 25 which drives the primary output terminal. Thus, a signal path exists from the primary input terminal to the primary output terminal which serially passes through components 21, 22, 23, 24, and 25.

Also in portion 10a of station 10, the secondary input terminal SI is connected to the input of a receiver 26 which in turn has its output connected to an input of a multiplexer 27. Multiplexer 27 has its output connected to the input of a transmitter 28, and transmitter 28 has its output connected to the secondary output terminal SO. Thus, a data path exists from the secondary input terminal to the secondary output terminal which serially passes through components 26, 27, and 28.

In addition, the output of receiver 26 connects to a second input of multiplexer 22. Thus, a data path exists from the secondary input terminal SI to the primary output terminal PO which serially passes through components 26, 22, 23, 24, and 25.

Further, the output of multiplexer 23 connects to a second input of multiplexer 27. Thus, a data path exists from the primary input terminal PI to the secondary output terminal SO which serially passes through components 21, 22, 23, 27, and 28.

Also included in portion 10a of station 10 is a pair of detectors 31 and 32. Detector 31 monitors the output signals from receiver 21 to determine if silence (S), and idle signal (I), or a delimiter signal (D) exists at the output of the receiver. In one preferred embodiment, an idle signal (I) is an unmodulated carrier; and a delimiter signal is a modulated carrier. Silence (S) is the absence of any signal on an input terminal. Detector 32 monitors the output of receiver 26 for S, I, and D in a similar fashion.

Station portion 10a also includes a sequential logic circuit 33. Circuit 33 receives respective signals from the detectors 31 and 32 indicating whether S, I, or D exists at the output of a receiver, and in response thereto, circuit 33 sends control signals to the multiplexers 22, 23, 24, and 27 which selectively pass the multiplexer input signals to their output. Dashed lines are used in FIG. 2 to indicate the paths along which control signals pass to the multiplexers. All of the details by which circuit 33 operates to control the multiplexers 22, 23, 24, and 27 are described herein in conjunction with FIGS. 3, 4A and 4B.

Station portion 10a also includes two signal generators 34 and 35. Generator 34 generates the idle signal, while generator 35 generates the delimiter signal. Idle signals from generator 34 are sent to respective inputs on multiplexers 24 and 27, and delimiter signals from generator 35 are also likewise sent to the respective inputs on multiplexers 24 and 27. These signals I and D selectively pass through the multiplexers to the output terminals PO and SO in response to the control signals from the sequential logic circuit 33.

Figure 3:
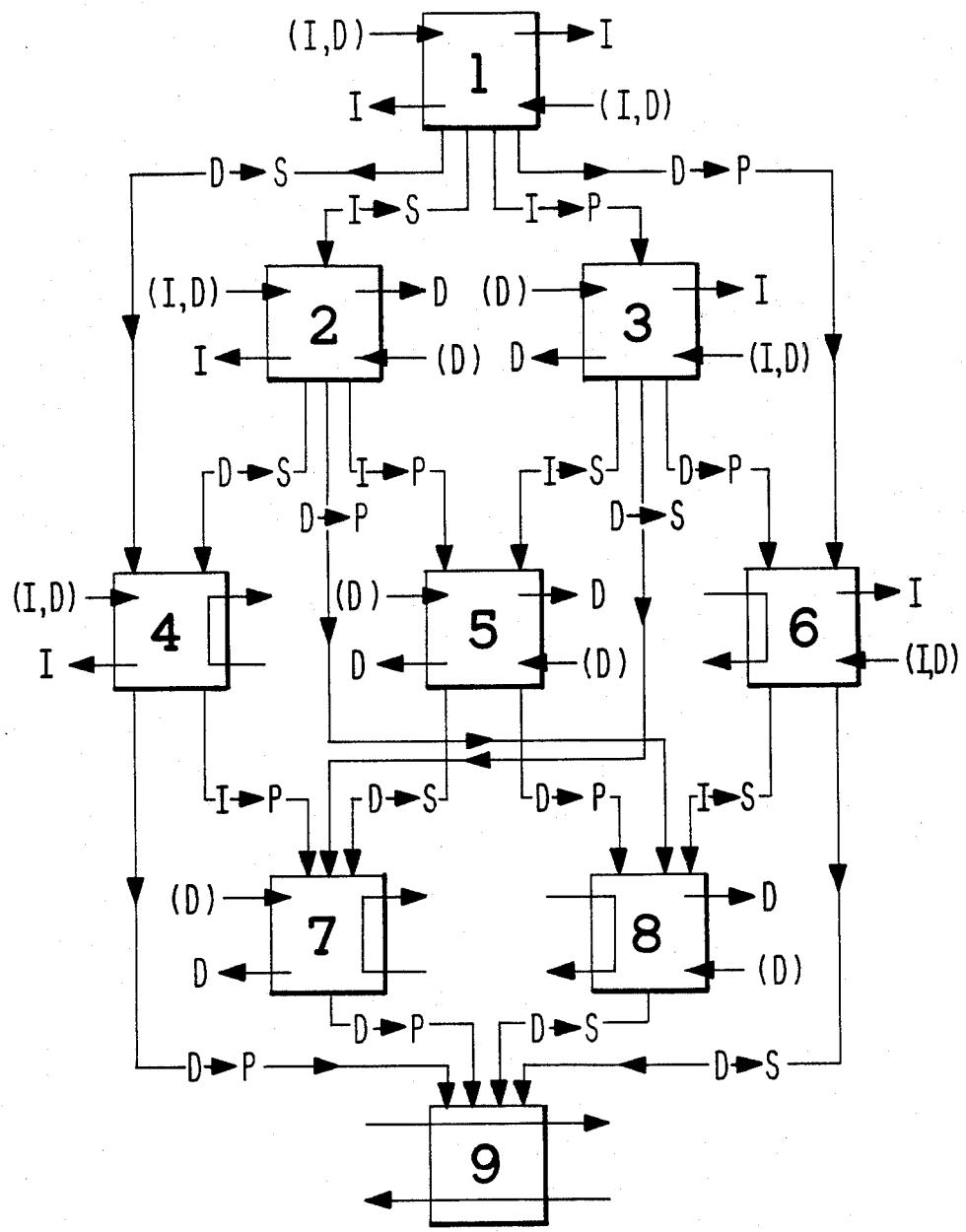
FIG. 3 shows a state diagram which defines the operation of the sequential logic circuit in FIG. 2.

Consider now the state diagram of FIG. 3. This diagram defines the operation of circuit 33. In FIG. 3, each state of circuit 33 is represented by one of the squares 1 through 9. An arrow which enters the square at the upper left side represents the primary input terminal PI; an arrow which leaves the square at the lower left side represents the secondary output terminal SO; an arrow which leaves the square at the upper right side represents the primary output terminal PO; and an arrow which enters the square at the lower right side represents the secondary input terminal SI.

Some of the output terminals in some of the states of FIG. 3 have the letter I next to them. That means that in those states, the idle signal I is being passed from generator 34 to the output terminal. Similarly, some of the output terminals in some of the states of FIG. 3 have the letter D next to them. That means that in those states, the output of generator 35 is being passed to the output terminal. For example, in state 2, idle signals are passed to the second output terminal and delimiter signals are passed to the primary output terminal.

Also in FIG. 3, some of the input terminals of some of the states have the letters I or D in parentheses next to them. That means that in those states, circuit 33 is monitoring the input terminal for the signals that are in parentheses. If a signal in parentheses is detected, then circuit 33 changes to a different state. Transitions from one state to another are indicated in FIG. 3 by the arrows which leave the bottom of a square and enter the top of another square.

For example, in state 2, circuit 33 monitors the primary input terminal PI for an I or a D signal, and it also monitors the secondary input terminal SI for a D signal. A transition from state 2 to state 4 occurs if a D signal is detected on the secondary input terminal; a transition from state 2 to state 8 occurs if a D signal is detected on the primary input terminal; and a transition from state 2 to state 5 occurs if an I signal is detected on the primary input terminal.

Also in FIG. 3, some of the states show some of the input terminals and output terminals being internally connected together. For example, state 4 shows the secondary input terminal internally coupled to the primary output terminal, and state 6 shows the primary input terminal internally coupled to the secondary output terminal. Also, state 9 shows the primary input terminal internally coupled to the primary output terminal and the secondary input terminal internally coupled to the secondary output terminal. These internal couplings are made by the multiplexers 22, 23, 24, and 27 of FIG. 2 in response to the control signals from circuit 33.

Inspection of the FIG. 3 state diagram shows that circuit 33 operates in accordance with the following rules:

(a) Idle signals are generated on the output terminal of a paired set of terminals whenever silence is detected on the input terminal of that pair.

(b) If an idle signal is detected on an input terminal, then a transition is made to another state. In the new state, a delimiter signal is sent on the output terminal that is paired with the input terminal on which the idle signal was detected.

(c) If a delimiter signal is detected on an input terminal, then a transition is made to another state. In the new state, the input terminal on which the delimiter signal is detected is coupled internally within the station to an output terminal of the station in a predetermined fashion to thereby permit signals on the input terminal to pass through the station.

Preferably, in accordance with rule c, the following substeps are performed:

(c1) When the delimiter signal is detected on the input terminal of one paired set of terminals, the other paired set of terminals is examined to determine if they are coupled together.

(c2) If the other paired set of terminals is not coupled together, then the input terminal on which the delimiter signal was detected is internally coupled to the output terminal of that same one set of terminals.

(c3) If the other paired set of terminals is internally coupled together, then that coupling is broken and the input and output terminals of opposite paired sets are internally coupled together.

By operating the stations 10 of a network in accordance with the above described steps, each station establishes whether or not the coupling 11 between it and the adjacent stations is broken, and it causes actions to occur within the station if the coupling is not broken which enables signals to pass through the station. This in turn causes the network to change from a form wherein none of the stations are able to send messages to any other station to another form wherein every station is able to send a message to any other station.

Such a change in form can occur when a station is initially powered on, or when a station was broken and has been repaired, or when the coupling 11 between stations was broken and has been repaired. By operating each station in accordance with the above steps, as many stations as possible will couple themselves together in the event that some of the stations remain powered off or the coupling 11 between some of the stations remains broken.

Figure 4A:
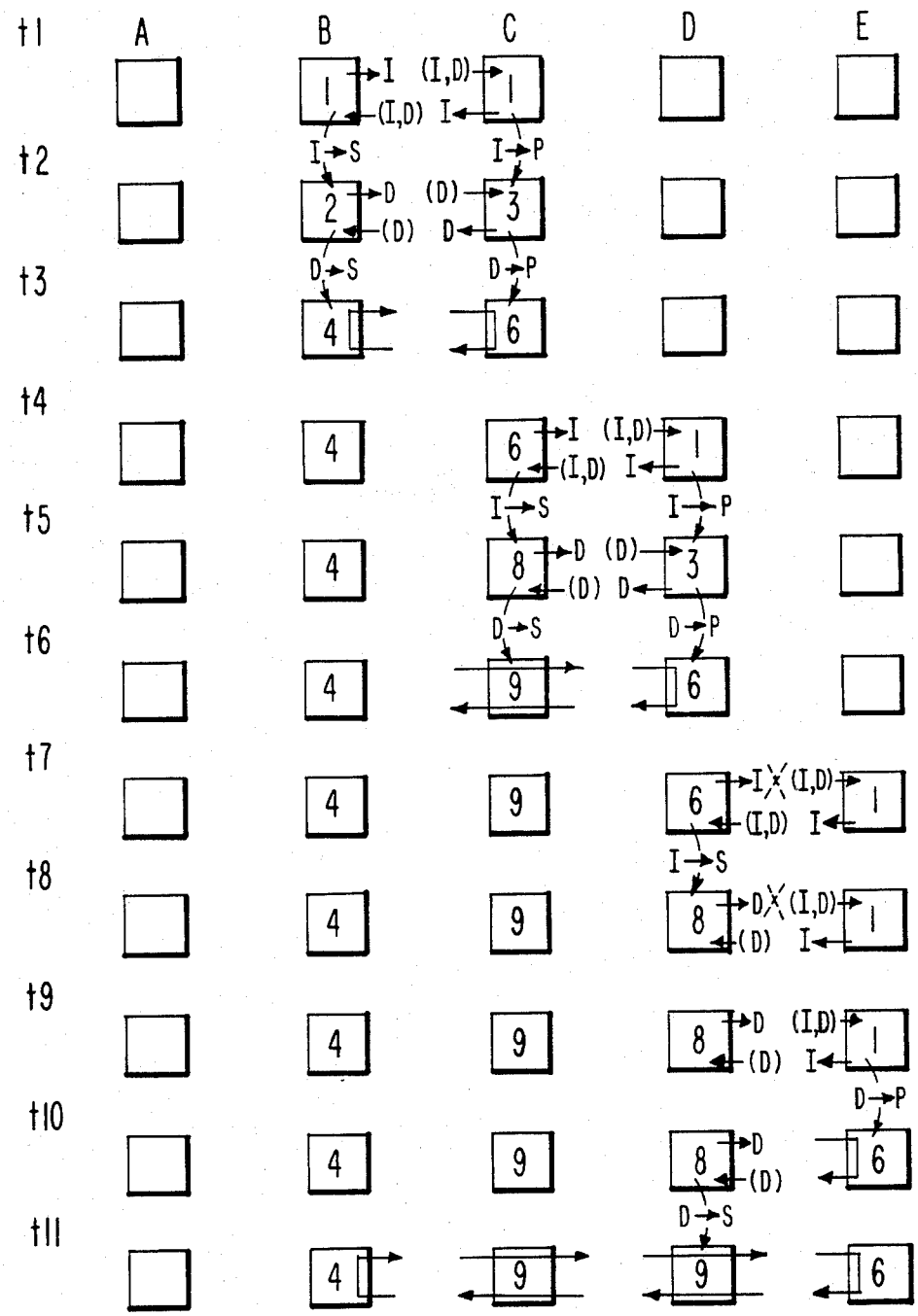
FIGS. 4A and 4B show a sequence of state transitions which the stations of FIG. 1 make in accordance with the state diagram of FIG. 3.
Figure 4B:
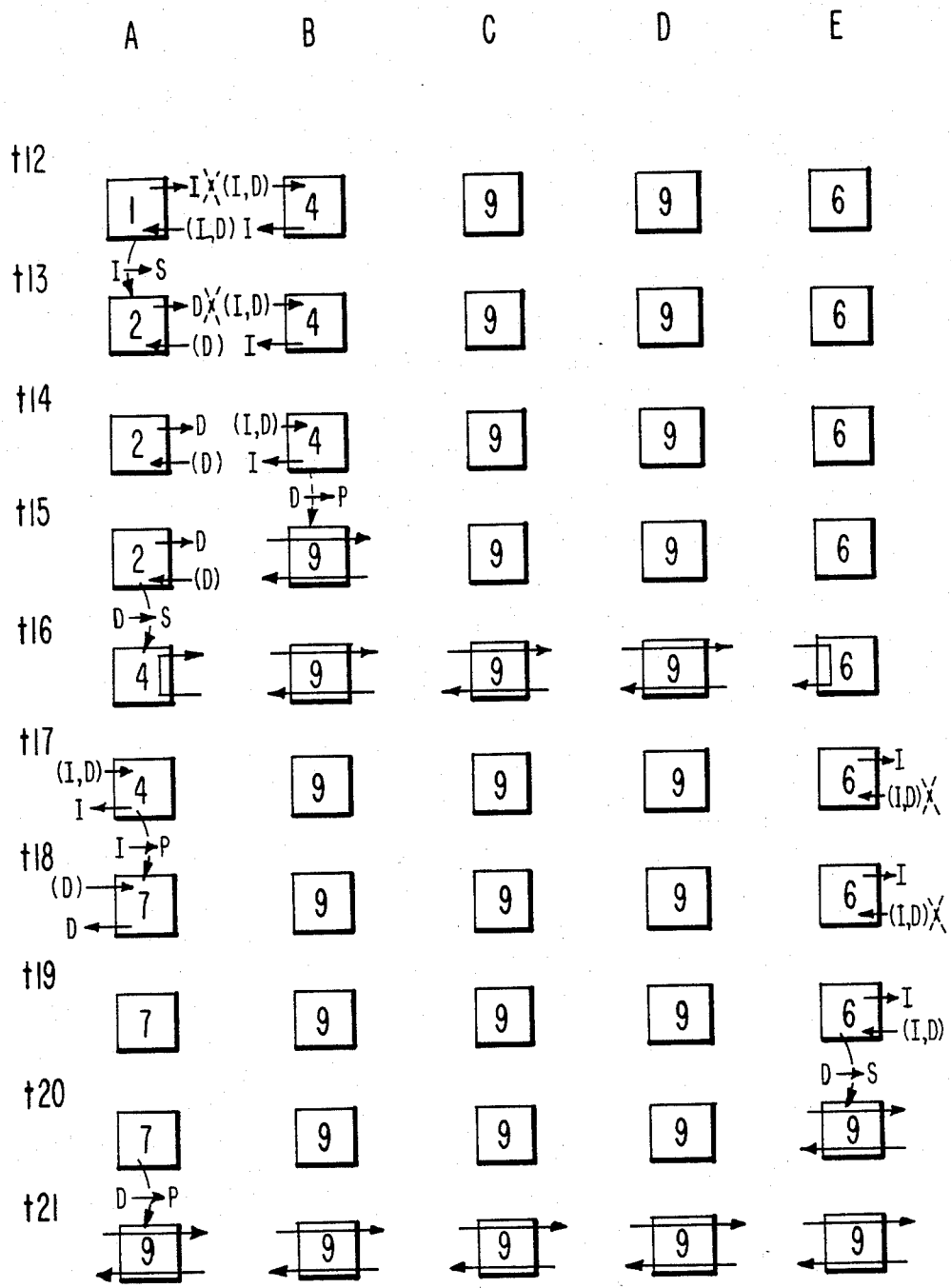

Reference should now be made to FIGS. 4A and 4B which illustrate an example of how five stations can sequentially couple themselves together by operating in accordance with the above-described steps. FIGS. 4A and 4B each contain an array of squares, and each square illustrates the state of a particular station at a certain time. Columns of the array are labeled A, B, C, D, and E to respectively indicate the five different stations; while the rows of the array are labeled t1, t2, t3, . . . to respectively indicate the various times.

Prior to time t1, the coupling 11 between stations B and C is broken. Accordingly, stations B and C enter state 1 wherein they receive silence on their input terminals and generate idle signals on their output termnals. Later, at time t1, the coupling from the secondary output terminal of station C to the secondary input terminal of station B is complete. Then station B detects the idle signal on its secondary input terminal, and so at time t2 it makes a transition to state 2. Likewise, at time t1, the coupling from the primary output terminal of station B to the primary input terminal of station C is complete. Thus station C detects an idle signal on its primary input terminal and makes a transition to state 3 at time t2.

In state 2, station B monitors its secondary input terminal for the delimiter signal. Station B will receive the delimiter signal only if the coupling from its primary output terminal to the primary input terminal of station C is complete. If that coupling were broken, station C would still be transmitting the idle signal. So when station B detects the delimiter signal in state 2, it knows that the coupling both to and from station C is complete. Thus, at time t3, station B makes a transition to state 4 wherein it couples its secondary input terminal to its primary output terminal.

Likewise, when station C at time t2 receives a delimiter signal on its primary input terminal, it knows that the coupling both to and from station B is complete. Otherwise, station C would still be receiving an idle signal on its primary input terminal. Accordingly, station C makes a transition at time t3 to state 6. In state 6, the primary input terminal is coupld internally to the secondary output terminal. Stations B and C are now able to send messages to each other.

Next, at time t4, station D is initially powered on; or alternatively, the coupling between stations D and C is initially completed. In either case, station D transmits idle signals from its secondary output terminal which station C receives for the first time, and station C transmits idle signals from its primary output terminal which station D receives for the first time. In response, at time t5, station C makes a transition to state 8, and station D makes a transition to state 3.

In state 8, station C transmits delimiter signals on its primary output terminal, and station D transmits delimiter signals on its secondary output terminal. These delimiter signals are detected by stations C and D respectively on their secondary input terminal and primary input terminal. Due to this detection, station C makes a transition to state 9 at time t6, and station D makes a transition to state 6 at the same time.

In state 9, station C has its primary input terminal coupled to its primary output terminal, and station C also has its secondary input terminal coupled to its secondary output terminal. Thus, a communication path is formed through stations B, C, and D whereby they can send messages to each other.

Next, at time t7, station E initially powers on with only the coupling from its secondary output terminal to the secondary input terminal of station D being complete. Alternatively, station E had been powered on with the coupling between both terminals of stations D and E being broken; and at time t7, only the coupling from the secondary output terminal of station E to the secondary input terminal of station D is fixed. A dashed X between the primary output terminal of station D and the primary input terminal of station E at time t7 indicates that the coupling between those terminals remains broken.

Under the above conditions, station D receives idle signals on its secondary input terminal, but station E continues to receive silence on its primary input terminal. Accordingly, station D makes a transition to state 8 at time t8 while station E remains in state 1. In state 8, station D transmits the delimiter signal from its primary output terminal even though station E has not yet received an idle signal due to the broken coupling.

Subsequently, at time t9, the coupling from the primary output terminal of station D to the primary input terminal of station E is fixed. Thus, station E detects the delimiter signal on its primary input terminal; and in response thereto at time t10, station E makes a transition to state 6. Here again the receipt of a delimiter signal indicates that both the coupling to station D and the coupling back to station E must be complete. Otherwise station D would still be transmitting an idle signal.

In state 6, station E couples its primary input terminal to its secondary output terminal. Thus, the delimiter signal from station D is passed internally through station E and back to station D. Upon the receipt of this delimiter signal, station D at time t11 makes a transition to state 9. That transition to state 9 enables all the stations B, C, D, and E to transmit messages to each other.

For convenience, the state of stations A through E which is depicted at time t11 at the bottom of FIG. 4A is repeated at the top of FIG. 4B. Then, at time t12, the coupling from the secondary output terminal of station B to the secondary input termnal of station A is complete. Thus, station A detects an idle signal on its secondary input terminal, and in response thereto it makes a transition to state 2. This transition occurs at time t13.

In state 2, station 2 sends a delimiter signal on its primary output terminal. However, since the coupling from the primary output terminal of station A to the primary input terminal of station B is broken, station B sees only silence on its primary input terminal. Thus station A continues to send idle signals back to station A from its secondary output terminal. Stations A and B respectively remain in states 2 and 4 until the broken coupling is fixed.

In FIG. 4B, the broken coupling is depicted as being fixed at time t14. At that time, station B receives a delimiter signal on its primary input terminal from station A without having first received any idle signal from station A. However, station B knows that station A will not send a delimiter signal on its primary output terminal unless it received an idle signal from station B on its secondary input terminal. Thus, the receipt of the delimiter signal by station B indicates that the coupling both to and from station A is complete.

In response to the receipt of the delimiter signal, station B makes a transition to state 9. This occurs at time t15. In state 9, the primary terminals of station B are internally coupled together, and the secondary terminals of station B are also internally coupled together. Thus, the delimiter signal that is being sent from the primary output terminal of station A serially passes through stations B, C, D, E and then back through stations D, C, and B to station A.

When station A detects the delimiter signal on its secondary input terminal, it makes a transition to state 4. This occurs at time t16. In state 4, station A internally couples its secondary input terminal to its primary output terminal. A loop is thus formed whereby the stations A through E can send messages to each other by utilizing the coupling between both their primary and secondary terminals.

Next, at time t17, the coupling from the primary output terminal of station E to the primary input terminal of station A is fixed. Thus station A no longer receives silence on its primary input terminal, but instead it receives idle signals from the primary output terminal of station E. Station A recognizes these idle signals, and in response thereto it makes a transition to state 7. This occurs at time t18.

In state 7, station A sends delimiter signals from its secondary output terminal. However, since the coupling from the secondary output terminal of station A to the secondary input terminal of station E remains broken, station E continues to receive silence on its secondary input terminal. Thus station A continues to send idle signals from its primary output terminal. Stations A and E respectively remain in states 7 and 6 until the broken coupling between them is fixed.

That broken coupling is indicated in FIG. 4 as being fixed at time t19. Thus at time t19, station E receives a delimiter signal on its secondary input terminal. This delimiter signal being reviewed without first receiving an idle signal tells station E that the coupling between it and station A is complete. Thus, at time t20, station E makes the transition from state 6 to state 9.

In state 9, station E has its primary termnals internally coupled together and it has its secondary terminals internally coupled together. Thus, the delimiter signal that is being transmitted from the secondary output terminal of station A is serially passed through the secondary terminals of stations E, D, C, and B back to the secondary input terminal of station A. Station A, however, is looking for a delimiter signal on its primary input terminal. This delimiter signal is generated by one of the stations B, C, D, or E as part of the normal message-sending process through those stations since a delimiter is simply a modulated carrier.

Station A thus receives a delimiter signal on its primary input terminal; and in response thereto, it makes a transition from state 7 to state 9. This occurs at time t21. At time t21, all of the stations A through E have their primary terminals internally coupled together, and all of the stations also have their secondary terminals internally coupled together. This is the final configuration of the network; and in it, the stations need only use the coupling 11 between their primary terminals to send messages to each other.

From the above it should be evident that a station portion 10a can change state in many other sequences besides those shown in FIGS. 4A and 4B. All of those state changes will, however, be in accordance with the state diagram of FIG. 3.

Suppose, for example, that after the network has reached its final configuration as illustrated at time t21 in FIG. 4B, the coupling becomes broken between stations B and C, and between stations E and A. In that event, stations A and C would receive silence on their primary input terminal and thus would go back to state 4. Likewise, stations B and E would receive silence on their secondary input terminal and thus would go back to state 6. Messages could then be sent between stations A and B and between stations C, D, and E.

Subsequently, the coupling between stations B and C could become fixed which would cause stations B and C to go back to state 9. That would place the network back in the state shown at time t16 in FIG. 4B.

In addition, various waveforms other than those which were described above can be used for the idle signal I and the delimiter signal D. For example, an idle signal can be a carrier that is modulated in a predetermined fashion; while the delimiter signal can be a carrier that is modulated in any other fashion. Suitably, the idle signal could be a modulated carrier which represents a binary 1010 . . . sequence while the delimiter signal could be a modulated carrier which represents any other binary sequence.

Several types of circuit chips can be used to implement station portion 10a of FIG. 2. See, for example, the *TTL Logic Data Manual* 1982 by Signetics which describes various chips for receivers and multiplexers. An exact implementation of the detector circuits 31 and 32 will depend upon the signal waveforms that are used for the idle and delimiter signals.

As an example, an unmodulated and modulated carrier can be detected by sampling the output signal of a receiver at several times the carrier frequency and counting the number of consecutive high voltage samples and the number of consecutive low voltage samples. If the high and low voltage samples are approximately equal in number, then the carrier is unmodulated; whereas if the high and low samples vary at about a 2:1 ratio, then the carrier is modulated. Silence can be detected as no change in the receiver output signal over a time period of several carrier cycles.

Suitably, the sequential logic circuit 33 can be comprised of a microprocessor such as an Intel 8048 chip. Alternatively, the sequential logic circuit can be a special purpose logic circuit that operates in accordance with the state diagram of FIG. 3. How to design a sequential logic circuit given its state diagram is taught by the text *Finite-State Models for Logical Machines* by Frederick C. Hennie, 1968, published by John Wiley & Sons, Inc., Library of Congress #67-29935.

Also, from the above it should be apparent that the interstation coupling need not be restricted to two bit-serial data paths. Multibit parallel input and output lines can also intercouple the stations. Thus, in general, each station will have two sets of input-output ports. Each port will have a predetermined number of input lines which constitutes an input section, and a predetermined number of output lines which constitutes an output section.

Accordingly, since many such variations and modifications should be apparent from the above-described specific details, it is to be understood that the invention is not limited to those details but is defined by the appended claims.

What is claimed is:

1. A method of operating a station having two input-output ports for coupling said station to two other stations in a communication network; said method including the steps of:

monitoring the input section of one port in said station to detect an idle signal, a delimiter signal, or silence thereon;

transmitting said idle signal from the output section of said one port if silence is detected by said monitoring step;

sending said delimiter signal from the output section of said one port if said idle signal is detected by said monitoring step; and coupling internally in said station the input section of said one port to an output section of either said one port or the other port of said station in a predetermined fashion to permit signals on the input section of said one port to pass through said station if said delimiter signal is detected by said monitoring step.

2. A method according to claim 1 and further including the steps of:

breaking any internal coupling between the input and output sections of the other port if such coupling exists when said delimiter signal is detected by said monitoring step; and coupling internally in said station the input and output sections of opposite ports if said breaking step is performed.

3. A method according to claim 1 and further including the step of:

coupling the input section of said one port to the output section of said one port if the input and output sections of the other port are not coupled together when said delimiter signal is detected by said monitoring step.

4. A method according to claim 1 and further including the step of:

peforming said monitoring step, transmitting step, sending step, and coupling step on the input and output sections of the other port in parallel and in any sequence with the steps of claim 1.

5. A method according to claim 1 and further including the step of:

detecting said idle signal on the input section of said one port by sensing a signal waveform of predetermined shape, detecting said delimiter signal by sensing a signal waveform of any other shape, and detecting silence by sensing the absence of any signal.

6. A method according to claim 1 and further including the step of:

detecting said idle signal on the input section of said one port by sensing an unmodulated carrier and detecting said delimiter signal by sensing any modulated carrier.

7. A method of operating a station having two input-output ports for coupling said station to a communication network; said method including the steps of:

running said station in a first state in which an idle signal is transmitted on the output section of one port so long as silence is received on the input section of said one port;

changing the operating mode of said station from said first state to a second state in which a delimiter signal is transmitted on the output section of said one port if said idle signal is received on the input section of said one port; and switching from said first state or said second state to a third state in which the input section of said one port is coupled internally in said station to an output section of said station if said delimiter signal is detected on the input section of said one port while in said first or second states respectively.

8. A method according to claim 7 and further including the steps of:

breaking any internal coupling between the input and output sections of the other port if such coupling exists when said delimiter signal is detected in said first or second states on the input section of said one port; and coupling internally in said station the input and output sections of opposite ports if said breaking step is performed.

9. A method according to claim 7 and further including the step of:

coupling the input section of said one port to the output section of said one port if the input and output sections of the other port are not coupled together when said delimiter signal is detected in said first or second states on the input section of said one port.

10. A method according to claim 7 and further including the step of:

detecting said idle signal on said input section on said one port by sensing a signal waveform of predetermined shape, detecting said delimiter signal by sensing a signal waveform of any other shape, and detecting silence by sensing the absence of any signal.

11. A method according to claim 7 and further including the step of:

detecting said idle signal on the input section of said one port by sensing an unmodulated carrier and detecting said delimiter signal by sensing any modulated carrier.

* * * * *